(12) United States Patent
Li et al.

(10) Patent No.: US 7,781,060 B2
(45) Date of Patent: Aug. 24, 2010

(54) HOLLOW SILICA NANOPARTICLES AS WELL AS SYNTHESIS PROCESSES AND APPLICATIONS THEREOF

(75) Inventors: Weidong Li, San Jose, CA (US); Shivkumar Chiruvolu, San Jose, CA (US); Hui Du, Sunnyvale, CA (US); Igor Altman, Fremont, CA (US); Ronald J. Mosso, Fremont, CA (US); Nobuyuki Kambe, Menlo Park, CA (US)

(73) Assignee: NanoGram Corporation, Milpitas, CA (US)

( * ) Notice: Subject to any disclaimer, the term of this patent is extended or adjusted under 35 U.S.C. 154(b) by 224 days.

(21) Appl. No.: 12/002,916

(22) Filed: Dec. 18, 2007

(65) Prior Publication Data

US 2008/0145641 A1    Jun. 19, 2008

Related U.S. Application Data

(60) Provisional application No. 60/875,984, filed on Dec. 19, 2006.

(51) Int. Cl.
*B32B 5/16* (2006.01)
(52) U.S. Cl. .................. 428/402; 428/446; 977/773; 977/783; 977/811
(58) Field of Classification Search ............... 428/402, 428/446; 977/773, 783, 811
See application file for complete search history.

(56) References Cited

U.S. PATENT DOCUMENTS

| | | | |
|---|---|---|---|
| 2,885,366 A * | 5/1959 | Iler ............................. 516/90 |
| 5,024,826 A * | 6/1991 | Linton ........................ 423/335 |
| H001447 H * | 6/1995 | Linton ........................ 428/404 |
| 5,922,299 A | 7/1999 | Bruinsma et al. |
| 5,958,348 A | 9/1999 | Bi et al. |
| 6,103,379 A | 8/2000 | Margel et al. |
| 6,132,773 A * | 10/2000 | Amiche ...................... 424/490 |
| 6,221,326 B1 * | 4/2001 | Amiche ...................... 423/335 |
| 6,583,071 B1 | 6/2003 | Weidman et al. |
| 6,599,631 B2 | 7/2003 | Kambe et al. |
| 6,849,334 B2 | 2/2005 | Horne et al. |
| 6,913,825 B2 | 7/2005 | Ostafin et al. |
| 7,062,142 B2 | 6/2006 | Chen et al. |

(Continued)

FOREIGN PATENT DOCUMENTS

EP    1787959 A1    5/2007

(Continued)

OTHER PUBLICATIONS

Botterhuis et al., "Hollow Silica Spheres with an Ordered Pore Structure and Their Application in Controlled Release Studies", Chem. Eur. J., 12:1448-1456 (2006).

(Continued)

*Primary Examiner*—H. (Holly) T Le
(74) *Attorney, Agent, or Firm*—Dardi & Herbert, PLLC; Peter S. Dardi

(57) ABSTRACT

Hollow silica nanoparticles can have well defined non-porous shells with low shell fragmentation and good dispersability. These well defined hollow particles can be formed through the controlled oxidation of silicon nanoparticles in an organic solvent. The hollow nanoparticles can have a submicron secondary particle sizes. The hollow silica nanoparticles can be incorporated into polymer composites, such as low index-of-refraction composites, for appropriate applications.

25 Claims, 7 Drawing Sheets

U.S. PATENT DOCUMENTS

| | | | |
|---|---|---|---|
| 2005/0037201 A1 | 2/2005 | Hirai et al. |
| 2005/0145163 A1 | 7/2005 | Matsuki et al. |
| 2005/0154086 A1 | 7/2005 | Yoneyama |
| 2005/0200036 A1 | 9/2005 | Mosso et al. |
| 2005/0244322 A1 | 11/2005 | Chen et al. |
| 2006/0042414 A1 | 3/2006 | Sankaran et al. |
| 2006/0120941 A1 | 6/2006 | Chen et al. |
| 2006/0269733 A1 | 11/2006 | Mizuno et al. |
| 2007/0212510 A1 | 9/2007 | Hieslmair et al. |
| 2008/0057228 A1 | 3/2008 | Horie et al. |

FOREIGN PATENT DOCUMENTS

WO    2005094230 A2    10/2005

OTHER PUBLICATIONS

Caruso et al., "Nanoengineering of Inorganic and Hybrid Hollow Spheres by Colloidal Templating", Science, 282:1111-1114 (1998).

Colder et al., "Strong Visible Photoluminescene from Hollow Silica Nanoparticles", Nanotechnology, 15:L1-L4 (2004).

Suratwala et al., "Effect of Humidity During the Coating of Stober Silica Sols", Journal of Non-Crystalline Solids, 349:368-376 (2004).

Tu et al., "Hollow Nanostructures Based on the Kirkendall Effect: Design and Stability Considerations", Appl. Phys. Lett. 86: 093111-1-3 (2005).

Yin et al., "Formation of Hollow Nanocrystals Through the Nanoscale Kirkendall Effect", Science, 304: 711-714 (2004).

* cited by examiner

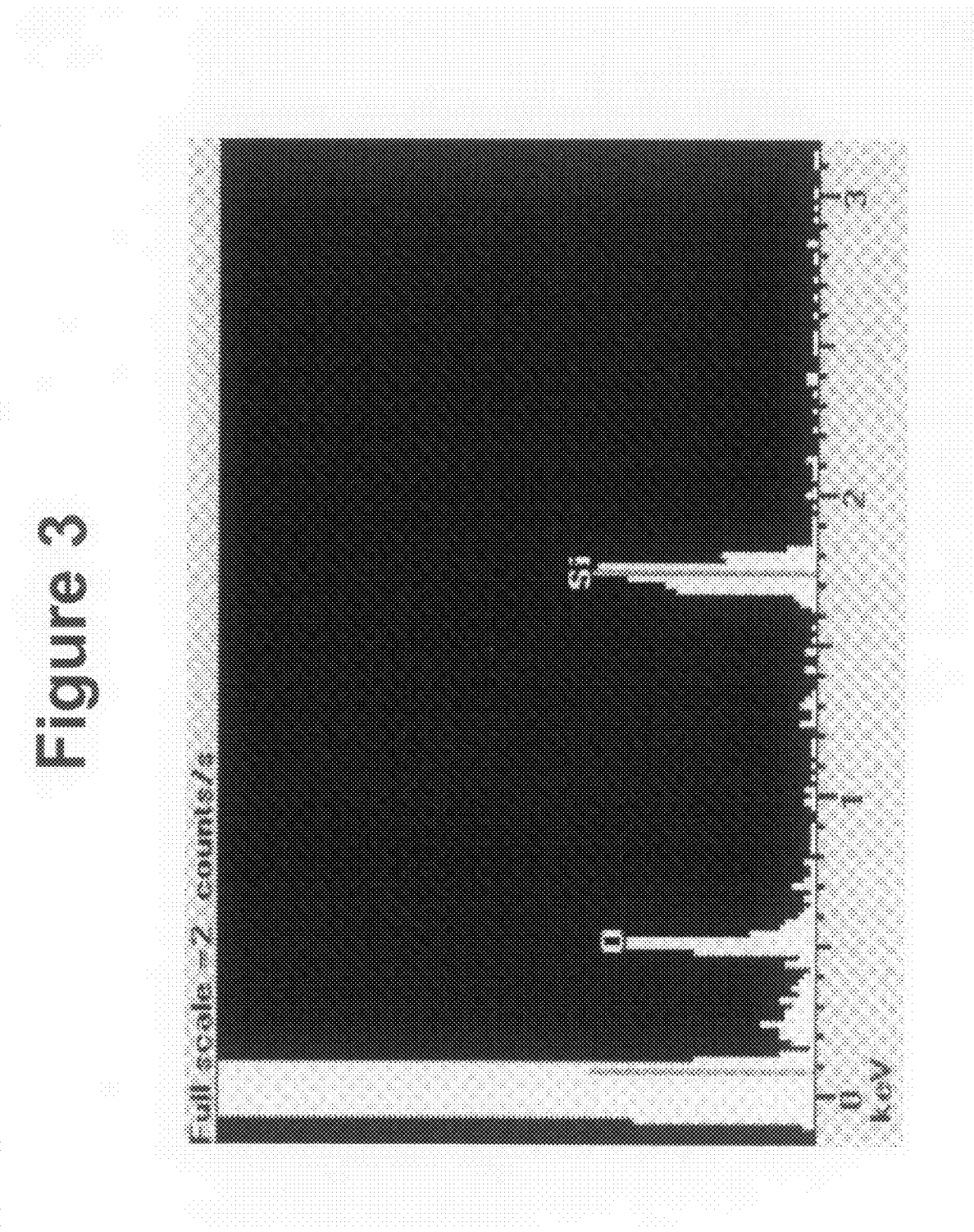

US 7,781,060 B2

HOLLOW SILICA NANOPARTICLES AS WELL AS SYNTHESIS PROCESSES AND APPLICATIONS THEREOF

CROSS REFERENCE TO RELATED APPLICATIONS

This application claims priority to copending U.S. Provisional Patent Application Ser. No. 60/875,984 filed on Dec. 19, 2006 to Li et al., entitled "Hollow $SiO_2$ Nanoparticle Synthesis, Properties, Dispersion and Application," incorporated herein by reference.

FIELD OF THE INVENTION

The invention relates to collections of hollow silica nanoparticles, as well as methods for producing these nanoparticles based on the controlled oxidation of silicon nanoparticles. The invention further relates to applications for the hollow silica nanoparticles to take advantage of properties resulting from the hollow nature of the particles.

BACKGROUND OF THE INVENTION

Silica, i.e., silicon dioxide or $SiO_2$, has been used for a wide range of optical material for a long period of time, for example as a primary component of window glass. In modern optical materials, silica-based glass is appropriately modified, such as with dopants, for particular applications, such as fiber optics, planar optical waveguides and the like. A range of other materials, such as polymers are also widely used in optical applications. The index-of-refraction is a significant optical parameter since it influences the resulting optical properties of the material and interfaces with the material. However, silica-based materials have also found use in a range of other fields, such as dielectrics for electronics applications. Modern material applications introduce a wide range of demands on material performance to continually improve the resulting products. Thus, there is a desire to continue to develop new types of materials that can meet present and future material demands.

SUMMARY OF THE INVENTION

In a first aspect, the invention pertains to a collection of hollow particles comprising $SiO_2$ with a shell over a hollow core and having an average primary particle size of no more than about 750 nm. In some embodiments, no more than about 10 percent of the particle shells are fractured, and there are no visible pores in a transmission micrograph at a magnification corresponding to 10 nm per centimeter.

In a further aspect, the invention pertains to a collection of hollow particles comprising $SiO_2$ with a shell over a hollow core and having an average primary particle size of no more than about 750 nm and a Z-average particle size in propylene glycol following vigorous mixing of no more than about 500 nm. In some embodiments, the average shell thickness is from about 5 percent to about 40 percent of the particle diameter.

In another aspect, the invention pertains to a method for the formation of hollow silica particles comprising the step of adding water to a dispersion of silicon particles in an organic solvent under basic conditions to form an oxidation mixture. The silicon particles can have an average diameter of no more than about 500 nm, and the quantity of water and reaction conditions can be selected to yield visibly hollow silica particles as evaluated with electron microscopy.

In other aspects, the invention pertains to a composite comprising a polymer and from about 1 weight percent to about 80 weight percent hollow silica particles dispersed within the polymer. Generally, the hollow silica particles have an average primary particle size of no more than about 750 nm. In some embodiments, the hollow silica particles have no visible pores in a transmission micrograph at a magnification corresponding to 10 nm per centimeter.

Moreover, the invention pertains to a method for forming a composite comprising hollow silica particles and a polymer, the method comprising forming a composite from a dispersion comprising a mixture of hollow silica particles in an organic solvent with a polymer soluble with the organic solvent. In some embodiments, the composite comprises from about 5 weight percent to about 80 weight percent hollow silica particles. The composite can have a transmission of a visible light frequency of at least about 85 percent as a film with a 5 micron thickness formed on a silica glass with an index-of-refraction of 1.45.

BRIEF DESCRIPTION OF THE DRAWINGS

FIG. 3 is a plot of an energy dispersive x-ray spectrum (EDS) demonstrating the composition analysis of the hollow silica.

DETAILED DESCRIPTION OF THE INVENTION

Figure 1:
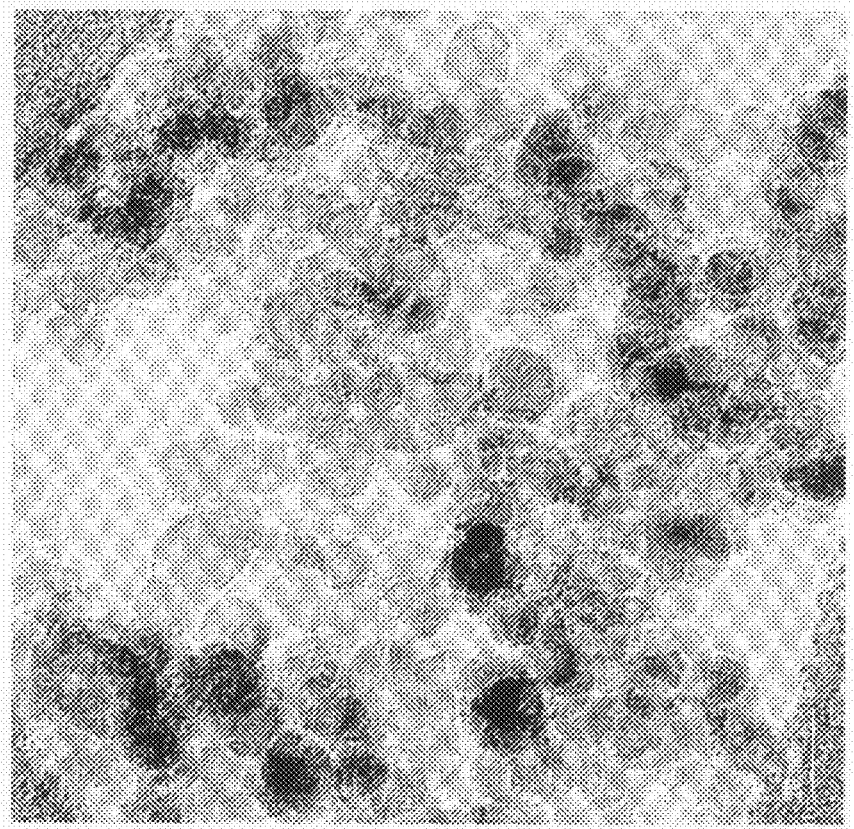
FIG. 1 is a transmission electron micrograph (TEM) showing 15 nm Si nanoparticles from NPM™ process.

As described herein, relatively uniform and mechanically stable hollow nanoparticles are described with well formed silica shells. The formation of these hollow silica nanoparticles is made possible by an improved process involving the controlled oxidation of silicon nanoparticles. In contrast with previous approaches, controlled oxidation conditions are obtained through the dispersion of the silicon nanoparticles in a polar solvent followed by the oxidation with appropriate amounts of water under basic conditions. A two step oxidation approach can be particularly effective at controlling the properties of the resulting particles. The resulting particles have a majority of hollow silica particles with shells that appear solid, i.e., non-porous, in transition electron micrographs, and the particles are substantially dispersible in suitable liquids. The hollow silica particles can be incorporated into composite materials that exploit the hollow nature of the particles, for example, with respect to low index of refraction, low dielectric constant, low thermal conductivity and low coefficient of thermal expansion.

The hollow silica, i.e., $SiO_2$, particles have a void that effectively provides a gaseous space into any resulting structure where the void is supported through a ceramic shell to provide desired structure and corresponding mechanical properties. Thus, the hollow silica particles are a low density material that can be incorporated into corresponding composites to provide desirable properties. The processing approaches described herein provide the flexibility with respect to selection of the properties of the hollow particles while providing intact silica shells.

The hollow silica particles are observed to have an average particle size slightly larger than the initial silicon particles. This expansion in particle size is thought to be due to the incorporation of the oxygen into the particles. While the outer shell expands, it is believed that strain in the core ultimately and a higher reaction rate during a second oxidation step, for appropriate embodiments, results in the formation of the hollow core as the oxidation reaction proceeds inward into the particle. Nevertheless, if the initial silicon particles are relatively uniform with respect to particle size, the resulting silica particles can be correspondingly uniform.

In contrast with the approaches described herein, some earlier approaches have described silica based materials that can provide a reduced index-of-refraction, but these approaches either result in particle fusing and/or porous particles or films that lack the desirable properties of the particles and methods described herein. For example, an approach described by Colder et al., Nanotechnology Volume 15 (January 2004) L1-L4, incorporated herein by reference, describes the oxidation of silicon nanoparticles directly in water, which results in less reproducibility and less control over the oxidation conditions, as well as fusing of the hollow particles, if formed. This approach is described further in a comparative example below. Template based methods for the formation of mesoporous hollow silica nanoparticles are described in U.S. Pat. No. 6,913,825 to Ostafin et al., entitled "Process for Making Mesoporous Silicate Nanoparticle Coatings and Hollow Mesoporous Silica Nano-Shells," and published U.S. Patent application 2005/0244322A to Chen et al., entitled "Hollow-Structured Mesoporous Silica Material and Preparation Process," both of which are incorporated herein by reference. Mesoporous silica particles have an inherently highly porous structure that has no clear hollow interior, although these particles also introduce some degree of gaseous volume and corresponding low density. Mesoporous particles provide less of a barrier to physical contaminants since the pores tend to absorb contaminants. A silica shell deposited over a mesoporous silica core is described in published European patent application EP 1 787 959 A1 to Muraguchi et al., entitled "Silica-Based Fine Particles, Method for Production Thereof, Coating for Forming Coating Film and Base Material Having Coating Film Formed Thereon," incorporated herein by reference. The EP '959 application describes a curing step with heat to densify the shell. However, the formation process necessarily results in a porous shell.

For processing to form the hollow silica particles, silicon particles, such as crystalline silicon particles, are used as starting materials. The silicon particles generally have an average particle size of no more than about 500 nm. In some embodiments, the silicon particles are uniform with respect to particle size and have a high degree of crystallinity, although amorphous particles undergo comparable chemical oxidation so that amorphous silicon particles should be suitable for forming hollow silica particles. In embodiments of particular interest, the resulting hollow silica nanoparticles generally are amorphous and can have an average diameter no more than about 750 nm. The particles can be uniform with respect to particle size and with respect to the particle collections not having fragmented particles. A large majority of the particles have the appearance of hollow particles. The shell can have a selectable average thickness, which generally is at least about 10 percent of the particle thickness to avoid significant particle fragmenting.

For the formation of the hollow particles, the crystalline silicon particles can be dispersed in a polar solvent to facilitate the processing to make uniform voids in the product silica particles. Due to the controlled oxidation conditions described herein, the product hollow silica particles can be well dispersed as formed. In other words, through the use of controlled oxidation conditions, the surfaces of the particles are not prone to fusing with neighboring particles as a result of the reactive conditions during the oxidation process. In particular, the particles can remain substantially unfused following the oxidation process. The dispersability of the nanoparticles can be evaluated using the secondary particle size in a dispersion, which can be evaluated as a Z-average using dynamic light scattering. In general, the Z-average particle size can be no more than 2 microns.

The oxidation process along with the appropriate selection of the initial silicon particles can be performed to synthesize hollow silica particles with controllable average particle size and shell thickness within reasonable ranges. A theoretical description of the general formation of hollow nanostructures from solid nanoparticles has been described in terms of different diffusion rates of atoms moving within the structure and the resulting Kirkendall effect. See, K. N. Tu and U. Gosele, Appl. Phys. Lett. 86 (2005) 093111-1-3, incorporated herein by reference. With respect to the starting materials, crystalline silicon (elemental-Si) particles can be synthesized using laser pyrolysis. Generally, the silicon nanoparticles can be produced also by other approaches, such as flame synthesis and other thermal processes. The synthesis of silicon nanoparticles using a plasma reactor is described further in published U.S. Patent Application 2006/0042414A to Sankaran et al., entitled "System and Method for Making Nanoparticles Using Atmospheric-Pressure Microreactor," incorporated herein by reference. Also, for example, a grinding approach with a thermal plasma treatment step to form silicon nanoparticles is described in published U.S. Patent Application 2005/0145163A to Matsuki et al., entitled "Composition for Forming Silicon Film and Method for Forming Silicon Film," incorporated herein by reference.

However, laser pyrolysis is a desirable approach since uniform silicon particles can be formed with good uniformity at reasonable production rates. For example, the synthesis of silicon particles by laser pyrolysis is described further in W. R. Cannon et al., "Sinterable Powders from Laser-Driven Reactions: II, Powder Characteristics and Process Variables," J. American Ceramic Society, July 1982 65(7):330-335, incorporated herein by reference. For higher production rates, crystalline silicon nanoparticles with desirable uniformity and dispersability can be produced from the NanoGram NPM™ laser pyrolysis process. See, for example, U.S. Pat. No. 5,958,348 to Bi et al., entitled "Efficient Production of Particles by Chemical Reaction," incorporated herein by reference.

The formation of doped silicon nanoparticles using laser pyrolysis is described in copending U.S. patent application Ser. No. 11/717,605 to Hieslmair et al., entitled "Thin Silicon or Germanium Sheets and Photovoltaics Formed From Thin Sheets," incorporated herein by reference. These doped silicon particles can be used to form corresponding doped hollow silica. In particular, boron dopants and fluorine dopants can be used to reduce the index-of-refraction of the particles. For a further discussion of dopants see U.S. Pat. No. 6,849,334 to Horne et al., entitled "Optical Materials and Optical Devices," incorporated herein by reference.

Once appropriate silicon nanoparticles are obtained, the silicon nanoparticles are suspended in a polar organic solvent or mixture of solvents, such as an alcohol(s), that is miscible with water or dissolves a reasonable amount of water. The solvent should be selected to dissolve water such that later added water easily blends into the organic solvent to provide the oxidizing agent to the silicon particles. The silicon particles do not need to stably disperse in the organic solvent. However, it is desirable for the silicon particles to disperse well under mixing conditions. Crystalline silicon particles formed by laser pyrolysis generally disperse appropriately well in polar solvents as synthesized. To alter the dispersion properties of the silicon particles such as to increase the dispersion concentration, the surface of the silicon particles can be modified through interaction with surface modifying compounds that may or may not chemically bond with the particle surface. Suitable non-bonding chemical modifying agents include, for example, surfactants. The surface modification can interfere with the oxidation process if the molecules interfere with contact and/or water migration into the particles. Thus, a surface modifier and the degree of surface modification should be selected appropriately.

The dispersed nanoparticles are oxidized through the addition of water under basic pH conditions. The reaction is controlled to prevent fragmentation of the particles or extensive fusing of the particles. Thus, in contrast with the present approach, if the reaction is performed in water, the initial particles generally at least fuse or in some cases completely lose their integrity such that films are formed with little no particle morphology maintained.

Through the use of an organic solvent, water can be added gradually to yield a slower, controlled oxidation. Water provides the oxidizing agent ($H_2O$). Base can be added at least initially to catalyze the reaction through the formation of hydroxide ions, $OH^-$. Suitable bases include, for example, ammonia, $NH_3$, which forms ammonium hydroxide, $NH_4OH$. The overall oxidation reaction is as follows:

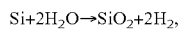
$$Si + 2H_2O \rightarrow SiO_2 + 2H_2,$$

so hydrogen gas is released by the reaction, although some of the silicon atoms can undergo partial oxidation to form hydroxide groups according to the following reaction:

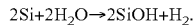
$$2Si + 2H_2O \rightarrow 2SiOH + H_2.$$

Through the use of ammonia as the base, the resulting silica particles can be essentially free of metal elements that can become undesirable contaminants for some applications, especially when combined with semiconductor grade solvents and water. Silane precursors for the silicon particles can be essentially metal free. In particular, the silica particles can comprises no more than 10 ppm atomic and in further embodiments no more than about 1 ppma. A person of ordinary skill in the art will recognize that additional ranges of contaminant levels within the explicit ranges are contemplated and are within the present disclosure.

In some embodiments, the oxidation step can take place in two steps in which water is added at the start of each step to perform the oxidation of the silicon into silica. Water generally is limiting in the first step, and while not wanting to be limited by theory, it is thought that the outer portion of the particles is oxidized in this first step. The oxidation of the particle shells tends to expand the shells, which can provide strain on the interiors of the particles.

In a second oxidation step, additional water can be added that generally results in the oxidation of the particle core under strain introduced due to the first oxidation step. Due to the strain and the relatively higher reaction rate in the second step as a result of the increased amount of water, it is thought that the shell expands and the core dissolves and re-deposits along the inner surface of the shell. While control of the reaction favors performing the oxidation relatively slowly, prolonging the reaction can result in destruction of the shell since amorphous silica is somewhat soluble in water under basic conditions. Therefore, once the hollow silica is formed with desired properties, the reaction can be stopped as described further below. The water additions can be performed in greater than two addition steps, and the base, such as $NH_4OH$, can be added in corresponding multiple steps with water as well.

The amount of water and the reaction time can be adjusted to control the oxidation conditions. Furthermore, the addition of water for the second step in a two step oxidation process can be performed gradually or continuously until the desired amount of water is added. If more water is added, the shell of the resulting particles generally is thinner because of an increased dissolving of silicon hydroxide from both outside and inside of the structure. Similarly, longer reaction times can result in thinner shells. There can be a trade off between time for the reaction and control of the reaction and of the properties of the resulting particles. It can be desirable for the reaction to not take too long, but the properties of the final particles are generally the more important criteria.

After completion of the reactions to form the hollow shells, the reaction can be terminated, generally through removal of water and/or base, such as through vacuum evaporation solvent shift. Alternatively or additionally, the solvent can be evaporated partially or completely, and/or the solvent can be displaced through dialysis relative to a new solvent. In general, it is not desirable to completely evaporate the solvent since any dissolved silica can precipitate out in undesirable ways, such as to fuse the particles and since a significant amount of energy is used to evaporate solvent. The termination of the reaction can also be performed by precipitating the particles through the addition of a miscible solvent in which the silica particles are not stably dispersed in the combined solvent, or through the adjustment of the pH to more acidic conditions, although pH adjustment generally should be performed at low particle concentration with a weak acid to avoid gelling.

Once the hollow silica particles are formed, they can be dispersed for further processing or use. Generally, the particles can be dispersed in polar solvents, such as alcohols, at dilute concentrations with appropriate mixing and/or sonication. The redispersed hollow particles can be surface modified. For example, a surface condensation process can be used to convert hydroxide groups on individual hollow particle surfaces to siloxane or —Si—O—Si— structures that increase the shell density, i.e., make the shell less porous, and correspondingly increase the mechanical strength. Furthermore, since oxides, such as silica, can be surface modified with chemically bonded species to alter the surface chemistry, surface modification agents such as trialkoxy silanes or carboxylic acids can be used to surface modify inorganic oxide particles. These surface modification methods can be useful to make the particles more easily dispersed at higher concentrations and/or in less polar liquids.

In general, the hollow silica nanoparticles can be incorporated into a structure, for example, as a powder or as a component of a composite material. In some embodiments, it may be desired to deliver the hollow particles as a powder that can be deposited as a layer or patterned powder. The powders can be delivered with a dispersion in a liquid so that the particles can be uniformly introduced to the desired structure. The liquid can then be removed to leave the powders in the corresponding structure.

In some applications, it may be desirable to incorporate the hollow silica nanoparticles into composites with polymers since the polymers can function as a binder. In general, the particles may or may not be surface modified, although surface modification can be used to facilitate composite formation for many polymers. To take advantage of the hollow silica properties, it may be desirable to have relatively high loadings of the hollow silica particles in the composite. The particular polymer can be selected to impart desired properties to the composite. The composite can take advantage of the unique properties of the hollow silica particles.

Porous silica films have been proposed for use in forming low dielectric constant films in U.S. Pat. No. 6,583,071 to Weidman et al., entitled "Ultrasonic Spray Coating of Liquid Precursor for Low K Dielectric Coatings," incorporated herein by reference. The hollow particles should mimic the low K properties of the porous films without introducing the absorption properties of the porous materials for applications where porosity is not desirable. In addition, mesoporous silica particles have been found suitable for the formation of low index of refraction optical materials for waveguides, as described in U.S. Pat. No. 7,062,142 to Chen et al., entitled "Organosilicate Materials With Mesoscopic Structures," incorporated herein by reference.

The hollow silica particles also have a low index-of-refraction. In particular, the hollow silica nanoparticles incorporate voids/air into the structure. Thus, polymer composites incorporating the hollow silica particles can be used to form low index-of-refraction substantially transparent material that can be formed into optical devices or coatings. The particles can contribute appropriately to the mechanical properties of the resulting composite. Also, the hollow silica particles have a low thermal conductivity, so these particles and composites formed with these particles can be used as thermal barriers. Similarly, the hollow particles have a low coefficient of thermal expansion without having an excessively low bulk modulus so that the material is not excessively rigid. Having a low coefficient of thermal expansion allows composites of the material to not crack as readily when they are used in conditions with significant temperature changes.

The hollow particles described herein generally do not have porosity visible under high resolution transition electron micrograph. Thus, the hollow particle structure may provide reduced or eliminated absorption of compositions that over time can contaminate the structure. Therefore, the hollow silica particles described herein can offer advantages over mesoporous materials with respect to stability over time as well as for the formation of a barrier to moisture and other environmental assaults that may be able to penetrate through composites formed with mesoporous particles. Simple testing with polymer composite films has confirmed a remarkable low moisture pick up for composites formed with the hollow silica nanoparticles described herein. Also, the particles exhibit good mechanical stability. Thus, the hollow silica particles described herein provide advantages for a range of applications.

Particle Properties

Silicon nanoparticles, such as crystalline silicon nanoparticles, provide the starting material for the formation of the hollow silica nanoparticles, and the properties of the initial silicon particles are reflected in the product particles. Thus, it can be advantageous to obtain silicon particles with appropriate values for the average particle size and particle size distribution. Following oxidation of the silicon, the resulting particles comprise amorphous silica. While the examples below are directed to crystalline silicon starting materials, amorphous silicon exhibits comparable chemistry so that it should undergo similar processing into hollow silica. The properties of the resulting hollow silica particles entail the exterior physical properties as well as the characteristics of the void or hollow core in the particle. Thus, the shell thickness relative to the particle diameter can influence certain particle properties, such as index-of-refraction and dielectric constant. The various parameters of the hollow silica particle properties can be balanced with respect to obtaining the desired mechanical and/or physical properties for materials and/or structures incorporating the hollow particles as appropriate for selected applications.

Generally, it is desirable for the silicon particles to be submicron, i.e. having an average diameter less than a micron, so that the particle can oxidize at a reasonable rate without the outer surface of the particle dissolving. Also, it is desirable for many applications for the product hollow particles to have a submicron average particle diameter. The oxidizing water diffuses through the particle structure to oxidize the entire volume of silicon. It can be reasonably assumed that the oxidation proceeds roughly from the outside of the particles to the interior. For optical applications of the resulting hollow silica particles, it is generally desirable for the crystalline silicon particles to have an average particle diameter of no more than about 100 nanometers (nm) so that the resulting hollow silica particles have desired optical properties, specifically high transparency and low scattering. The uniformity of the silicon particles can assist with the formation of uniform hollow silica particles. The uniformity of the hollow silica particles can be advantageous for optical properties as well as for the improved processing of the particles into a final product and for facilitating the packing of the particles at a higher loading into a material, whether as a composite or as a powder.

As noted above, the silicon submicron particles can be synthesized using, for example, flame pyrolysis, a plasma reactor or a thermal plasma treatment. However, laser pyrolysis is a desirable way to synthesize silicon particles due to the uniformity of the resulting particles. Laser pyrolysis is a light driven reactive flow process for powder production, i.e., for synthesis of submicron particles. A laser pyrolysis apparatus generally has a constrained flowing reactive stream that intersects a light beam at a light reaction zone to form a product stream downstream from a light reaction zone. The reactant stream is pyrolyzed by an intense light beam, such as a laser beam, which heats the reactants at a very rapid rate. The product particle properties are sensitive to the reaction conditions which can be adjusted over reasonable ranges. While a laser beam is a convenient energy source, other intense light sources can be used in laser pyrolysis, so the name can be slightly misleading, although the name is conventional in the art.

In general, a basic feature of successful application of laser pyrolysis for the production of inorganic nanoparticles is the generation of a reactant stream containing one or more metal/metalloid precursor compounds as well as, in some embodiments, a radiation absorber and/or a secondary reactant. The secondary reactant, when used, can be a source of non-metal/metalloid atoms, such as oxygen, required for the desired product and/or can be an oxidizing or reducing agent to drive a desired product formation. A secondary reactant may not be used if the precursor decomposes to the desired product under intense light radiation, as is the situation with silanes that decompose into elemental silicon. Similarly, a separate radiation absorber may not be used if the metal/metalloid precursor and/or the secondary reactant absorb the appropriate light radiation to drive the reaction, which is the situation with silane since the compound appropriately absorbs infrared light.

The reaction of the reactant stream is driven by an intense radiation beam, such as a light beam, e.g., a laser beam. In some embodiments, $CO_2$ infrared lasers can be effectively used. As the reactant stream leaves the radiation beam, the inorganic particles are rapidly quenched with particles present in the resulting product particle stream, which is a continuation of the flow of the reactant stream. The concept of a stream has its conventional meaning of a flow originating from one location and ending at another location with movement of mass between the two points, as distinguished from movement in a mixing configuration.

Suitable silicon precursors for elemental silicon particle formation include, for example, silane ($SiH_4$), disilane ($Si_2H_8$) and trisilane ($Si_3H_8$). Silane, $SiH_4$, is a convenient precursor for laser pyrolysis since it absorbs infrared light from a $CO_2$ laser and decomposes to form crystalline silicon particles upon decomposition. The higher order silanes similarly decompose to form elemental silicon, i.e. $Si^0$, silicon in its elemental state. Thus, with silane as a precursor, a secondary reactant source may not be used, and a separate infrared absorber is not needed. An inert gas can be used to moderate the reaction. Suitable inert gases include for example, Ar, He $N_2$ or mixtures thereof.

A laser pyrolysis apparatus suitable for the production of commercial quantities of particles by laser pyrolysis has been developed using a reactant inlet that is significantly elongated in a direction along the path of the laser beam. This high capacity laser pyrolysis apparatus, e.g., 1 kilogram or more per hour, is described in U.S. Pat. No. 5,958,348, entitled "Efficient Production Of Particles By Chemical Reaction," incorporated herein by reference. Other high capacity laser pyrolysis apparatuses are described in Published U.S. Patent Application 2005/0200036A to Mosso et al., entitled "Particle Production Apparatus," incorporated herein by reference. An improved laser pyrolysis apparatus for forming silicon particles based on improved quenching is described in copending U.S. provisional patent application Ser. No. 60/961,429 to Holunga et al., entitled "Laser Pyrolysis with In-Flight Particle Manipulation for Power Engineering," incorporated herein by reference.

As described herein, the silicon particles are processed into hollow silica particles that reflect the particle sizes of the initial silicon particles. It is observed that the average diameters of the silica particles are slightly larger than the average diameters of the parent silicon particles. The process provides for some control over the size of the void in the silica particles, which results in a corresponding shell thickness.

A collection of submicron/nanoscale particles, including, for example, silicon particles or hollow silica particles, may have an average diameter for the primary particles of less than about 500 nm, in some embodiments from about 2 nm to about 100 nm, alternatively from about 2 nm to about 75 nm, in further embodiments from about 2 nm to about 50 nm and in additional embodiments from about 2 nm to about 25 nm. A person of ordinary skill in the art will recognize that other ranges within these specific ranges are covered by the disclosure herein. Primary particle diameters are evaluated by transmission electron microscopy.

As used herein, the term "particles" refer to physical particles, which are unfused, so that any fused primary particles are considered as an aggregate, i.e. a physical particle or simply a "particle." For particles formed by laser pyrolysis, the particles can be generally effectively the same as the primary particles, i.e., the primary structural element within the material. If there is hard fusing of some primary particles, these hard fused primary particles form correspondingly larger physical particles. The primary particles can have a roughly spherical gross appearance, or they can have rod shapes, plate shapes or other non-spherical shapes. Upon closer examination, crystalline particles generally have facets corresponding to the underlying crystal lattice. Amorphous particles formed by laser pyrolysis generally have a spherical aspect. Diameter measurements on particles with non-spherical shapes are based on an average of length measurements along the principle axes of the particle.

Because of their small size, the particles tend to form loose agglomerates due to van der Waals and other electromagnetic forces between nearby particles. These loose agglomerates can be dispersed in a dispersing liquid to a significant degree, and in some embodiments roughly completely to form dispersed primary particles. The size of the dispersed particles can be referred to as the secondary particle size. The primary particle size, of course, is the lower limit of the secondary particle size for a particular collection of particles, so that the average secondary particle size can be approximately the average primary particle size if the primary particles are substantially unfused and if the particles are effectively completely dispersed in the liquid.

Even though the particles may form loose agglomerates, the nanometer scale of the particles is clearly observable in transmission electron micrographs of the particles. The particles generally have a surface area corresponding to particles on a nanometer scale as observed in the micrographs. Furthermore, the particles can manifest unique properties due to their small size and large surface area per weight of material.

The particles can have a high degree of uniformity in size. Laser pyrolysis generally results in particles having a very narrow range of particle diameters. As determined from examination of transmission electron micrographs, the particles generally have a distribution in sizes such that at least about 95 percent, and in some embodiments 99 percent, of the particles have a primary particle diameter greater than about 40 percent of the average diameter and less than about 200 percent of the average diameter. In additional embodiments, the particles generally have a distribution in sizes such that at least about 95 percent, and in some embodiments 99 percent, of the particles have a primary particle diameter greater than about 50 percent of the average diameter and less than about 160 percent of the average primary particle diameter. In embodiments of particular interest, the particles have a distribution of primary particle diameters such that at least about 95 percent, and in some embodiments 99 percent, of the particles have a primary particle diameter greater than about 60 percent of the average diameter and less than about 140 percent of the average primary particle diameter. A person of ordinary skill in the art will recognize that other ranges of uniformity within these specific ranges are covered by the disclosure herein.

Furthermore, in some embodiments essentially no particles have an primary particle diameter greater than about 5 times the average diameter, in other embodiments about 4 times the average diameter, in further embodiments 3 times the average diameter, and in additional embodiments 2 times the average diameter. In other words, the particle size distribution effectively does not have a tail indicative of a small number of particles with significantly larger sizes. This is a result of the small reaction region to form the inorganic particles and corresponding rapid quench of the inorganic product particles. An effective cut off in the tail of the size distribution indicates that there are less than about 1 particle in $10^6$ have a primary particle diameter greater than a specified cut off value above the average diameter. High particle uniformity can be exploited in a variety of applications.

In addition, the nanoparticles may have a very high purity level. Furthermore, crystalline nanoparticles, such as those produced by laser pyrolysis, can have a high degree of crystallinity. Silicon nanoparticles produced by laser pyrolysis can have a high degree of crystallinity as determined using x-ray diffraction.

The secondary particle size is the size of the particles in a dispersion in a fluid. The secondary particle size may depend on the subsequent processing of the particles following their initial formation and the composition and structure of the particles. In particular, the particle surface chemistry, properties of the dispersant, the application of disruptive forces, such as shear or sonic forces, and the like can influence the effectiveness of dispersing the particles. Secondary particle sizes are generally expressed as Z-average particle sizes, i.e., the cummulants mean particle size evaluation.

Secondary particles sizes within a liquid dispersion can be measured by established approaches, such as dynamic light scattering. Suitable particle size analyzers include, for example, a Microtrac UPA instrument from Honeywell based on dynamic light scattering, a Horiba Particle Size Analyzer from Horiba, Japan and ZetaSizer Series of instruments from Malvern based on Photon Correlation Spectroscopy. The principles of dynamic light scattering for particle size measurements in liquids are well established.

Z-average particle sizes are measured using dynamic light scattering. Alternatively, volume average particle sizes can be used to evaluate secondary particle sizes, although Z-average values are generally less variable in measurements. In some embodiments, the secondary particles have a Z-average particle size of no more than about 1000 nm, in additional embodiments no more than about 500 nm, in further embodiments from about 2 nm to about 300 nm, in other embodiments about 2 nm to about 100 nm, and alternatively about 2 nm to about 50 nm. A person of ordinary skill in the art will recognize that other ranges within these specific ranges are contemplated and are within the present disclosure.

The hollow silica nanoparticles comprise amorphous $SiO_2$. Amorphous materials lack long range order with respect to the atomic positions. In contrast, crystalline materials have long range order with the atoms arranged on a lattice. Crystallinity can be evaluated using x-ray diffraction.

The exterior diameter of hollow silica particles is covered in the discussion above. With respect to the hollow core, this can be observed in the electron micrographs since the particles are partially transparent to the electrons. Therefore, the hollow core is observed in a micrograph of a particle as a lighter portion of the image at the center of the particle. The size of the hollow cores can then be measured using the electron micro graph.

There are several reasonable ways to describe the size of the hollow core or correspondingly the dimensions of the shell. In particular, the shell can have an average thickness from about 1 nm to about 75 nm, in other embodiment from about 1.5 nm to about 50 nm and in further embodiments from about 1.5 nm to about 30 nm. However, it may be convenient to describe the shell thickness relative to the particle diameter, with an upper limit of the shell thickness being 50 percent of the diameter, which corresponds to no void in the particle. Thus, in some embodiments, the shells can have an average thickness from about 5 percent to about 40 percent of the average particle diameter, in other embodiments from about 5 percent to about 35 percent and in other embodiments form about 10 percent to about 30 percent. A person of ordinary skill in the art will recognize that additional ranges within the explicit ranges above relating to shell thickness are contemplated and are within the present disclosure.

In some embodiments, the particles have a low fraction of broken shells as determined from visual observation in transition electron micrographs. Specifically, the particles can have no more than about 10 percent broken shells, in other embodiments no more than about 5 percent broken shell and in further embodiments no more than about 1 percent broken shells. In some embodiments, there is no more than 0.01 percent broken shells. A person of ordinary skill in the art will recognize that additional ranges of broken shell percentages within the explicit ranges above are contemplated and are within the present disclosure.

The processes described herein provide for the synthesis of substantially unfused hollow silica particles. Under less controlled oxidation conditions, such as oxidation in water as the solvent, the dissolving and precipitation of the outer shell tends to both destroy the shell structure as well as fuse neighboring particles. This undesirable fusing of the particles can be reduced or eliminated through the controlled oxidation process described herein. If the particles are substantially unfused, the hollow particles can be well dispersed in organic solvents. Thus, small Z-average particle sizes can be obtained for the hollow silica particles, as generally described above. The well dispersed hollow particles can be more effectively used in corresponding applications.

While adapting the process to have a thinner shell can lead to accentuation of the properties of the hollow shell. For example, if the particles have a thinner shell, the particles generally have a lower index-of-refraction and a lower the dielectric constant. However, the shells become more mechanically fragile. Thus, a larger fraction of the shells may be broken, either as formed or following further processing. Also, the shells may not provide the desired mechanical strength to the ultimate material for the product, so that the shells are crushed in their eventual application. Therefore, there may be balances in the selection of the shell thickness. In addition, shell density may play a significant role for the selection of shell thickness. Particles with denser shells can have a thinner shell to achieve the same level of mechanical strength.

In addition to having excellent shell integrity, the hollow silica particles described herein also are essentially nonporous. For example, the lack of pores can be evaluated visually using a transmission electron micrograph. In particular, the particles can have no visible pores in a transmission electron micrograph at a magnification corresponding to 10 nm per centimeter. These results relating to the lack of pores can be similarly confirmed using water resistance as a measure. In the examples below, water resistance is measured using a coating formed with the particles with or without a polymer binder. In particular, the amount of time can be measured that a drop can be in contact with the coating before it leaves a visible mark after the drop is wiped off. For example, a coating of particle without a binder on a silicon substrate can be exposed to a drop for at least a minute without leaving a mark, in further embodiments, at least 30 minutes, in other embodiments at least about an hour without leaving a mark. Even longer times can be obtained using a cured polymethylmethacrylate binder. A person of ordinary skill in the art will recognize that additional ranges within the explicit ranges of exposure times are contemplated and are within the present disclosure.

Processes for Forming Hollow Particles

The processes described herein provide for the controlled oxidation of silicon nanoparticles to form the target hollow silica particles. The process involves the oxidation of the silicon by water under basic conditions. Control is achieved in part based on the use of an organic liquid with the addition of a controlled amount of water to perform the oxidation at basic pH. As the oxidation proceed, the hollow core is formed and the outer shell of the particle tends to expand to some degree, possibly due to the changing composition of the particle. In some embodiments, this process involves the initial addition of a sub-stoichiometric amount of water under basic conditions. Subsequent amounts of water complete the oxidation while simultaneously forming or completing the formation of the hollow core of the particles. Following completion of the reaction, water can be removed from the dispersion to stop the oxidation reaction and/or the solution can be acidified to inhibit solubilization of the silica and to stop further oxidation.

Generally, it is desirable to have silicon particles with clean surfaces free from oxidation or other contaminants that can slow or interfere with the controlled oxidation of the particles. Through the use of an organic solvent, the reaction proceeds in an inherently more controlled fashion than a reaction performed in water as the solvent. The oxidation can be performed in the organic solvent through the addition of a selected quantity of water at an alkaline pH such that the water oxidizes the silicon. In general, the water and/or base catalyst can be added in one or more increments. The dispersion can be mixed, for example with shear and/or sonication, during the oxidation process continuously, periodically or intermittently.

To prepare for the oxidation step, the silicon particles can be dispersed in a polar organic liquid. The organic liquid can be miscible with water or at least dissolve an appropriate amount of water to perform the oxidation. Suitable liquids include, for example, alcohols, such as methanol, ethanol, propanol, isopropyl alcohol, ethylene glycol, propylene glycol, mixtures thereof and the like. Propylene glycol is a good dispersant for both silicon particles and hollow silica particles, but propylene glycol can be more difficult to remove due to its relatively high boiling point relative to some other liquids.

The silicon particles can be dispersed in concentrations from about 0.1 weight percent to about 50 weight percent, in other embodiments from about 0.5 weight percent to about 25 weight percent and in further embodiments form about 1 weight percent to about 20 weight percent. A person of ordinary skill in the art will recognize that additional ranges of concentration within the explicit ranges above are contemplated and are within the present disclosure. The particles can be dispersed with mixing, which can involve the application of shear and/or sonication.

To initiate the oxidation reaction, the pH is generally adjusted through the addition of a base to the silicon particle dispersion along with the addition of water as an oxidizing agent. Faster rates of oxidation result from the addition of greater amounts of water and/or the addition of greater amounts of base to raise the pH to larger values. The selection of the rate generally involves some balance. In particular, if the rate is too slow the particle walls can dissolve and the processing cost increases due to the longer processing times. If the rate is too fast, the particle may not form unbroken shells, the particles may fuse together to an undesirable degree, and the processing mixture can gel to form an oxidized film rather than particles. Thus, it is generally desirable to have a relatively slow and controlled oxidation rate, but not excessively slow. The processing conditions are described herein to achieve this balance.

The pH can be adjusted, for example, to a pH of at least about 8.5, and in other embodiments to a value from 9 to 12 pH units to control the oxidation of the crystalline silicon to silica. A person of ordinary skill in the art will recognize that additional ranges of pH within the explicit ranges above are contemplated and are within the present disclosure. In general, the hydroxide, OH$^-$ ions formed by the base, catalyze the oxidation reaction. The oxidation reaction proceeds faster if the pH is adjusted to a higher value. Suitable bases include, for example, aqueous ammonia, NaOH and the like. It may be desirable to use a greater pH value for relatively larger particles to achieve an appropriate rate.

In general, the total amount of water added is sufficient to completely oxidize the silicon to form silica. In other words, the amount of water should be at least a stoichiometric amount of water, although generally several times this amount is used to form the hollow silica. Generally, the appropriate amount of total water used to achieve desired hollow silica particles depends on the crystal size, surface area, pH, temperature, solvent properties and concentration. The total amount of water can be selected empirically based on the teachings here, and several particular values are presented in the Examples below. The oxidation step can be continued for sufficient time to complete the oxidation of the silicon to silica and to form the hollow in the particles. In general, the oxidation process is continued for at least 5 minutes, in some embodiments from 15 minutes to about 40 hours and in other embodiments from about 25 minutes to about 24 hours. The reaction can be performed at room temperature or another selected temperature(s). The reactions to oxidize the silicon and form the hollow core are generally faster at higher temperatures. In general, the reaction can take place at a temperature from about 5° C. to about 95° C., in other embodiments from about 10° C. to about 70° C. and in further embodiments from about 20° C. to about 55° C. Of course, the selected temperature should be between the boiling point and freezing point of the selected organic liquid. The temperature can be varied to provide different temperatures at different stages of the oxidation process. A person of ordinary skill in the art will recognize that additional ranges of water amounts, time and temperature within the explicit ranges above are contemplated and are within the present disclosure.

Also, it can be advantageous to add the water in multiple steps to further control the reaction as well as to favor controlled formation of the hollow core. Through the addition of water in multiple steps, the initial rate does not have to be too fast since the initial amount of water is less than the total amount of water to be added. But the subsequent additions of water keep the rate from later becoming too slow. In some embodiments, the particles can be surface modified between oxidation steps to stabilize the dispersion and to slow the second oxidation step. This surface modification can be particularly useful to inhibit gelation with some solvents, such as methanol. Surface modification of the particles is described further below.

For embodiments with multiple water addition steps, in the initial oxidation step, the amount of water can be generally from about 10 percent to about 85 percent of the total water, in further embodiments from about 15 percent to about 80 percent and in additional embodiments from about 20 percent to about 75 percent of the total water. The conditions during an initial oxidation step seem to influence the properties of the ultimate shell formation. This initial amount of water is believed to oxidize the outer portion of the silicon particles. This initial amount of water can be selected based on particle size, initial oxidation level, solvent properties and concentration. In a particular embodiment, if the silicon particles are observed to have surface properties that result in more difficulty in oxidizing the particles, more water and/or a more basic pH can be used. In some embodiments, the first oxidation step can be continued for at least about 5 minutes, in other embodiments from 10 minutes to about 24 hours and in further embodiments form about 15 minutes to about 20 hours. A person of ordinary skill in the art will recognize that additional ranges of water and time within the explicit ranges above for an initial addition step are contemplated and are within the present disclosure.

An additional quantity or quantities of water can be added to complete the oxidation reaction. Generally, the additional quantity(ies) of water at least supply enough water such that the total amount of water is at least enough to completely oxidize the silicon. Specifically, the additional quantity(ies) of water can bring the total water to a selected value, and appropriate ranges of total water are discussed above. The oxidation involving the additional quantity(ies) of water generally can be performed for at least about five minutes, in some embodiments from about 10 minutes to about 24 hours and in further embodiments from about 15 minutes to about 20 hours. A person of ordinary skill in the art will recognize that additional ranges of water and times within the explicit ranges above are contemplated and are within the present disclosure. As noted above, the reaction with water can be performed at a selected temperature to adjust the rate of the reaction.

In general, the second quantity of water can be added at one time, in several portions or gradually. However, if the water is added in multiple units, the reaction generally proceeds more slowly. In addition, with an initial oxidation step, sufficient control of the reaction generally is obtained if the second amount of water is added at one time.

After the oxidation is completed, the solvent can be removed or exchanged to remove the water and base catalyst from contact with the hollow silica particles, and/or the solvent can be adjusted to a lower pH., i.e., a more acidic pH value. If the particles remain in contact with alkaline water, the silica shells can be damaged or destroyed over time due to the solubility of silica in alkaline water. For longer term stability of the particle shells, it is desirable to remove substantially amounts of the water. If the particles are refluxed as described herein to densify the shell through the oxidation of SiOH groups to form $SiO_2$ bonds, the resulting particles generally are less sensitive to water.

In alternative embodiments, the dispersion can be dialyzed using dialysis material to exchange the liquid to reduce or eliminate the water. The water and or organic solvent can be removed through evaporation. If the organic liquid boils at a higher temperature than water, the water can be selectively removed through heating the dispersion of the hollow silica particles.

A reflux process can be used to alter the quality of the hollow silica formed. During hollow silica formation and surface modification process, silanols are generated on the hollow silica surface. The presence of silanol groups on the hollow silica surface can contribute undesirable qualities in some embodiments. For example, free silanol groups on the surface of the hollow particles can cause high polarity and result in the hollow particles being incompatible to organic solvent like methylisobutylketone (MIBK). Additionally, free silanol groups on the surface of the hollow particles can lead to gelation among particles, especially at high concentrations. Free silanols also can result in moisture absorption. In some embodiments, the desired hollow silica have dense $SiO_2$ shell covered with silane-based surface modification agents, which means most if not all silanol groups are condensed or oxidized into $SiO_2$ or Si—O—Si units. If most of the silanol groups in the hollow silica shell are converted into $SiO_2$ and/or Si—O—Si units, the shell may be denser, i.e., less porous.

Additionally, reactant residues, such as water and ammonia, are not desired for hollow silica dispersion in some embodiments. Residual amounts of water and ammonia can keep reacting and cause poor stability of hollow particles. With suitable setup and controlled temperature, a reflux process can help to remove reactant residue and help converting silanol groups to $SiO_2$ or Si—O—Si units in hollow silica samples. For example, hollow silica can be first transferred from its reaction solvent, such as alcohol, to another organic solvent such as MIBK. The hollow silica/MIBK mixture can then be then refluxed, for example, at 110° C. for one hour. In general, the hollow particles can be refluxed for about 10 minutes to about 4 hours and in further embodiments from about 20 minutes to about 2 hours. A person of ordinary skill in the art will recognize that additional ranges of reflux times within the explicit times above are contemplated and are within the present disclosure. Reflux time and temperature can be adjusted based on reflux solvent used and the properties that are desired or the final hollow silica. A surface modification step can also be added before, during, such as between oxidation steps, or after hollow silica formation, after hollow particle formation before reflux and/or after reflux to reduce silica dissolution.

Composite Composition Properties and Formation

The hollow silica particles can be deposited into a product structure as a surface coating from a dispersion, or the particles can be incorporated into a composite material for use. The incorporation into a composite provides for the ability to combine the desirable features of the multiple composite materials. A polymer can function as a binder for the hollow silica particles. The polymer and hollow silica particles can cooperate to provide desired properties of the resulting composite. In general, the hollow silica particles can be introduced into the composite at high loading levels. The hollow silica particles can be surface modified with an appropriate composition to facilitate the achievement of high loadings into the composites.

A range of surface modifying compounds can be used to chemically bond to the hollow particle surfaces. Suitable functional groups for bonding to inorganic particles with different compositions are described generally in U.S. Pat. No. 6,599,631 to Kambe et al, entitled "Polymer-Inorganic Particle Composites," incorporated herein by reference. In some embodiments, the surface modifying compound can be coated at a coverage from less than a monolayer to four or more monolayers. The amount of coverage can be estimated based on the surface area of the particles and the amount of compound that can be expected to pack along the particle surface.

Alkoxysilanes provide stable bonding to metal/metalloid oxide particles, such as silica. For example, trialkoxysilanes provide very stable bonding to metal/metalloid particle surfaces with potentially three points of bonding. The fourth side chain of the trialkoxysilanes provides the ability to influence the dispersability and other surface properties of the surface modified inorganic particles. Specifically, the fourth side chain of the silane can be selected to improve dispersability in a selected solvent and/or to provide a reactive functional group for further processing. Alternatively or additionally, the fourth side chain can be used to stabilize the interaction of the surface modified particle with a selected polymer so that a uniform composite can be formed. Similarly, polydialkoxysiloxy silanes provide stable bonding with the ability of each monomer unit to form two bonds to the particle. The polymer can wrap around the particles during the bonding process. With respect to the alkoxy side chains of the silanes, methoxy groups and ethoxy groups have been found to be effective in reacting with metal/metalloid oxide particle surfaces, and compounds with these alkoxy groups and a range of fourth functional groups are commercially available.

In addition to alkoxy silanes, chemical compounds with other functional groups can form bonds to silicon dioxide particles. Specifically, compounds with chlorosilicate (—SiCl) groups, some amine groups, carboxylic acid groups and hydroxide groups generally can bond to metal/metalloid oxide particle surfaces, such as $SiO_2$. Additional functional groups of these compounds can be similarly selected to yield desirable properties for the resulting surface modified particles.

Dispersions of the surface modified particles generally can be stably formed at greater particle concentrations relative to unmodified particles, with appropriate selection of the surface modifying agent and dispersing liquid. In particular, stable dispersion generally can be formed at greater than about 2 weight percent solids, in further embodiments at least about 4 weight percent solids and in other embodiments from about 5 weight percent solids to about 15 weight percent solids. The surface modified particles can have a Z-average particle size of no more than about 75 nm, in other embodiments no more than about 60 nm, and in further embodiments no more than about 50 nm for the Z-average particle size. With respect to the particle size distribution, essentially all of the secondary particles can have a size no more than 4 times the Z-average particle size, in further embodiments no more than about 3 times the Z-average particle size and in other embodiments, no more than about 2 times the Z-average particle size. In general, the Z-average secondary particle size can be no more than a factor of four times the number average primary particle size, in further embodiments no more than about 3 times the number average primary particle size and in additional embodiments no more than about 2 times the number average primary particle size. A person of ordinary skill in the art will recognize that additional ranges of particle loadings and secondary particle sizes and distributions within the explicit ranges above are contemplated and are within the present disclosure. Secondary particle sizes can be evaluated with dynamic light scattering.

To perform the surface modification, the liquid can be selected to balance the dispersion of the unmodified particles, the solubility of the surface modifying compound unbound to the particles and the dispersion of the particles following surface modification. Generally, the liquid may not be a particularly good dispersing liquid for the unmodified particles. Similarly, the liquid may not be a good solvent for the surface modifying agent. But if the surface modifying agent is somewhat soluble in the liquid and the unmodified particles can be dispersed with mixing, the surface modification reaction can be performed. As the particles become surface modified, the dispersion may stabilize as the reaction proceeds.

As described above, the hollow silica particles are formed in a dispersion through the oxidation of the silicon particles. Through this approach, the hollow silica particles are well dispersed as formed. As noted above, the hollow silica particles can then be manipulated following completion of the oxidation to remove water. The particles can be similarly manipulated to change the solvent for further processing such as surface modification. In general, it has been found effective to settle the particles by forming a liquid mixture in which the stability of the dispersion is lost. Centrifugation or filtration can be used to efficiently separate the particles from the liquid once they are no longer stably dispersed. If the particles are centrifuged, the liquid can be decanted from the precipitated particles. The particles can be washed one or more times with a selected dispersant to remove residual liquid. Then, the particles can be redispersed in the selected liquid, in general without fully drying the particles so that the particles are more easily dispersed subsequently in the selected liquids. In this way, the liquid can be changed for a later processing step through the selection of a surface modifier that facilitates dispersion in the selected liquid.

The surface modifying compound can be added directly into the hollow particle dispersion if it has some solubility, or the surface modification compound can be dissolved into a solvent that is miscible with or soluble in the liquid of the particle dispersion. After the surface modification is complete, the particles can be precipitated from the dispersant by mixing a suitable liquid into the dispersion that is soluble or miscible with the dispersant used to perform the surface modification, and then re-suspended in a desired dispersant for further processing.

Generally, the polymer component of the composite can be selected based on the desired properties of the resulting composite. As noted above, the surface modification of the particles can be consistent with forming a good dispersion in the composite of the hollow particles through the polymer matrix. It has been discovered that properly dispersing the particles within the composite can result in improved properties of the composite. Specifically, if the particles are dispersed within the polymer with a uniformity roughly on the distance scale of the associated distance scale of the corresponding property, the composite material has the appearances closer to a uniform single material. The improvement in composite properties with improved composite uniformity is described further in copending U.S. patent application Ser. No. 11/645,084 to Chiruvolu et al., entitled "Composites of Polymers and Metal/Metalloid Oxide Nanoparticles and Methods for Forming These Composites," incorporated herein by reference.

Suitable polymers include, for example, organic polymers, silicon-based polymers and mixtures thereof. Suitable organic polymers include, for example, polyamides (nylons), polyimides, polycarbonates, polyurethanes, polyacrylonitrile, polyacrylic acid, polyacrylates, polyacrylamides, polyvinyl alcohol, polyvinyl chloride, heterocyclic polymers, polyesters, modified polyolefins and mixtures and reasonable copolymers thereof. Composites formed with nylon polymers, i.e., polyamides, and inorganic nanoparticles can be called Nanonylon™. Suitable silicon-based polymers include, for example, polysilanes and polysiloxane (silicone) polymers, such as poly(dimethylsiloxane) (PDMS) and poly(methylphenyl siloxane)(PMPS). Polysiloxanes can be desirable polymers because of their transparency to visible and ultraviolet light, high thermal stability, resistance to oxidative degradation and their hydrophobicity. Other inorganic polymers include, for example, phosphazene polymers (phosphonitrile polymers). The polymers can be crosslinked to provide desired mechanical properties to the composite.

If the polymer in the composite is chemically bonded to the inorganic particles either directly or indirectly through the surface modifying agent, the polymer can be selected or modified to have suitable reactive functional groups. For chemical bonding to metal/metalloid oxide particles, in addition to alkoxy silane groups, chlorosilicate (—SiCl) groups, some amine groups, carboxylic acid groups and hydroxide groups can bond to the metal/metalloid oxide particles. Also, a surface modifying compound can be selected to have an appropriate functional group to react with a functional group of the polymer. A few representative examples which can be appropriately put on the surface modifier or the polymer, include, for example, carboxylic acid groups or epoxy group that are each reactive with amine groups, thiol groups or hydroxide groups. Suitable functional groups for binding surface modifying compositions or linkers with a polymer are described further in U.S. Pat. No. 6,599,631 to Kambe et al., entitled "Polymer-Inorganic Particle Composites," incorporated herein by reference.

The loading of inorganic particles can be selected to achieve desired properties of the composite. In general, the properties of interest include mechanical properties, such as mechanical strength and mechanical stability as well as functional properties, such as index-of-refraction or dielectric constant. The index-of-refraction of the composite generally can be approximated as a linear combination by the volume ratios of the inorganic particles and the polymer. In general, low particle loadings can be used if desired, but in some embodiments it is desirable to use high particle loadings. Particle loadings can be achieved with very good dispersion with up to about 80 weight percent, in other embodiments from about 1 weight percent to about 75 weight percent and in further embodiments from about 5 weight percent to about 65 weight percent. For some optical applications, the composite comprises at least about 5 weight percent particles. A person of ordinary skill in the art will recognize that additional ranges of particle loadings within the explicit ranges above are contemplated and are within the present disclosure.

In general, the index-of-refraction of the hollow silica particles depends on the average shell thickness and the average particle size. To achieve certain properties like low refractive index for some applications, the particle size, shell thickness, or ratio of shell thickness to particle size can be controlled. While the particle size is primarily determined by the initial silicon particle size, the shell thickness can be affected by the disintegration rate of both the inside and/or outside of the particle structure.

The index-of-refraction of the hollow particles can generally range form about 1.15 to about 1.40 index units. Organic polymers generally have an index-of-refraction from about 1.3 to about 1.6. Thus, the incorporation of the hollow silica particles provides considerable flexibility to form composites with a selected low index-of-refraction from about 1.25 to about 1.5 with desired overall properties such as mechanical and physical properties along with a desired index-of-refraction.

For optical applications, it can be desirable for the composite to have a high transmission in the visible portion of the spectrum. If small inorganic particles are used, the particles do not absorb light in the visible region. Specifically, since the particles are smaller than the wavelength of visible light if the particle sizes are less than 100 nm, the absorption spectrum of the particles is shifted into the ultraviolet and the visible spectrum can fall effectively to zero if the average primary particle diameter is on the order of 20 nm or less and the particles are highly crystalline. However, the particles in the composite can scatter visible light, thereby lowing the transmission of visible light, if the particle are either highly agglomerated or the particles are not uniformly distributed within the polymer. By forming a well dispersed particle dispersion with a Z-average secondary particle size is on the order of 100 nanometers or less and uniformly distributing the particles within the polymer, high levels of transmission can be achieved for the composite through the reduction of scattering.

Processes to form more uniform polymer inorganic composites have been developed. These are described in copending U.S. patent application Ser. No. 11/645,084 to Chiruvolu et al., entitled "Composites of Polymers and Metal/Metalloid Oxide Nanoparticles and Methods for Forming These Composites," incorporated herein by reference.

The transmission can be measured on a silica glass substrate relative to the polymer without any inorganic particles to provide a reference point. In some embodiments with a particle loading of at least about 5 weight percent in the composite, the composite has a transmission when formed into a film with a thickness of 5 microns for at least one visible wavelength of at least 85 percent relative to the polymer alone, in other embodiments at least about 87.5 percent, in further embodiments at least about 90 percent, in other embodiments at least about 92 percent, in some embodiments at least about 95 percent, and in additional embodiments from about 92 percent to about 98 percent. In some embodiments, these levels of transmission through the composite film extend across the entire visible wavelength range. In additional embodiments, these values of transmission through the composite film are achieved with a particle loading from about 20 weight percent to about 85 weight percent within the composite. A person of ordinary skill in the art will recognize that additional ranges of transmission within the explicit ranges above are contemplated and are within the present disclosure.

The composite can comprise useful additives, such as conventional additives for polymer materials. Generally the additives are included in amounts of no more than about 5 weight percent of the composite weight. Suitable additives include, for example, viscosity modifiers, antioxidants, UV stabilizers and the like. These additives can be selected to be transparent to visible light.

In general, it is desirable to have the hollow silica particles well dispersed within the polymer matrix such that the hollow silica particles are relatively uniformly distributed. This process is facilitated by dispersing the particles in a liquid that is miscible or soluble in the liquid that dissolves the polymer. The dispersion of particles can be added with appropriate mixing and at an appropriate rate to form the good dispersion of the particles in the polymer matrix.

Following formation of the composite solution, this material can be processed into desired coatings or structures for particular applications, as described in the following section.

Applications

The hollow silica nanoparticles can be used in various applications in which the hollow core provides advantageous properties with respect to the resulting structures. The particle shells provide mechanical stability as well as provide a potential barrier to contaminants, such as water in some embodiments. Due to the hollow core, the hollow silica particles provide a low index-of-refraction material for the formation of corresponding optical structures.

In general, the hollow particles can be applied with a dispersion to form a coating directly to a surface. The dispersing liquid can be removed to leave a particle coating, which may not be adhered strongly to the surface depending on the nature of the surface. However, in some embodiments, it is desirable to load the hollow silica particles into a polymer to form a composite, as described above.

The polymer properties and the particle loading can be based on the selected composite properties. For example, in some embodiments, the polymer can be selected to have abrasion resistance and relatively low index-of-refraction. The hollow silica particles can be selected to have a particular core size to balance mechanical strength and index-of-refraction. Relatively large particle loadings can be used to enhance the low index-of-refraction properties of the composite due to the greater contribution of the hollow particles to the properties of the composite.

The low index-of-refraction composite can be formed into optical structures, such as lenses or sheets, or formed into coatings or the like. The composite can be formed into structures using appropriate techniques, including, for example, conventional processes such as injection molding, casting, extrusion, compression molding, calendering, combinations thereof, or the like. The resulting composite structures can be incorporated into the ultimate product.

With respect to coating formation, the parameters of the coating can be selected based on the desired function of the coating. The coating may or may not cover an entire surface of the corresponding optical structure. Similarly, the thickness of the coating influences the optical performance. In general, the coatings can be relatively thick or relative thin. In some embodiments, the coating thickness ranges from 100 nanometers to 1 millimeter, and in other embodiments from 1 micron to 250 microns. The coating thickness can be approximately constant. The coating can be applied using any appropriate technique, including, for example, conventional techniques, such as dip coating, spray coating, knife edge coating, wire bar coating, extrusion, and the like.

EXAMPLES

Example 1

Formation of Hollow Silica with Controlled Oxidation of Silicon Particles

This example describes the steps of hollow silica formation starting from silicon nanoparticles using a controlled oxidation process.

(1) Silicon nanoparticles are synthesized by an NPM™ gas phase process. A $SiH_4$ gas was used as Si precursor and was delivered as a vapor. In the laser pyrolysis reaction, the silane decomposes and condenses into silicon nanoparticles in a laser reaction zone. Inert gases such as $N_2$ and Ar were used to modify the reaction temperature and stabilize the chemical reaction to produce uniform Si nanoparticles with desired crystallinity. A post-stream cooling by inert gas further reduced nanoparticle sintering. Particle size was controlled by varying the process pressure, reaction temperature, and total flow rate of $SiH_4$ and inert gases. FIG. 1 depicts a transmission electron micrograph (TEM) showing 15 nm Si nanoparticles synthesized from the NPM™ process. A comparable apparatus for synthesizing the silicon nanoparticles with cooling is described in copending U.S. provisional patent application Ser. No. 60/961,429 filed on Jul. 20, 2007 to Holunga et al., entitled "Laser Pyrolysis with In-Flight Particle Manipulation for Powder Engineering," incorporated herein by reference. See in particular FIG. 8 of this provisional application.

(2) Hollow Si Nanoparticles are Formed by a Wet Chemical Post Treatment Process.

(a) Silicon (5 mg) nanoparticles were dispersed in propylene glycol (4.75 ml) and sonicated for 90 min in a bath sonicator to form a mixture.

(b) De-ionized (D.I.) water (0.25 ml) was added as an oxidation agent to the mixture and shake well.

(c) Aqueous ammonia (24%) was added to the mixture to adjust the pH of the mixture to basic (pH=10.25). The aqueous ammonia was used here as a catalyst for the oxidation of Si particles.

(d) The mixture was subsequently sonicated at no more than 25° C. for 60 min.

(e) Additional D.I. water (2 ml) was added to complete the oxidation of the Si particles.

(f) The mixture was bath sonicated at no more than 25° C. until the solution becomes transparent (~45 min). Alternatively, the mixture was settled over a long enough period at no more than 25° C. without sonication.

Figure 2A:
FIGS. 2a and 2b are a transmission electron micrograph (TEM) image and a high resolution TEM (HRTEM) image of hollow silica, respectively.
Figure 2B:
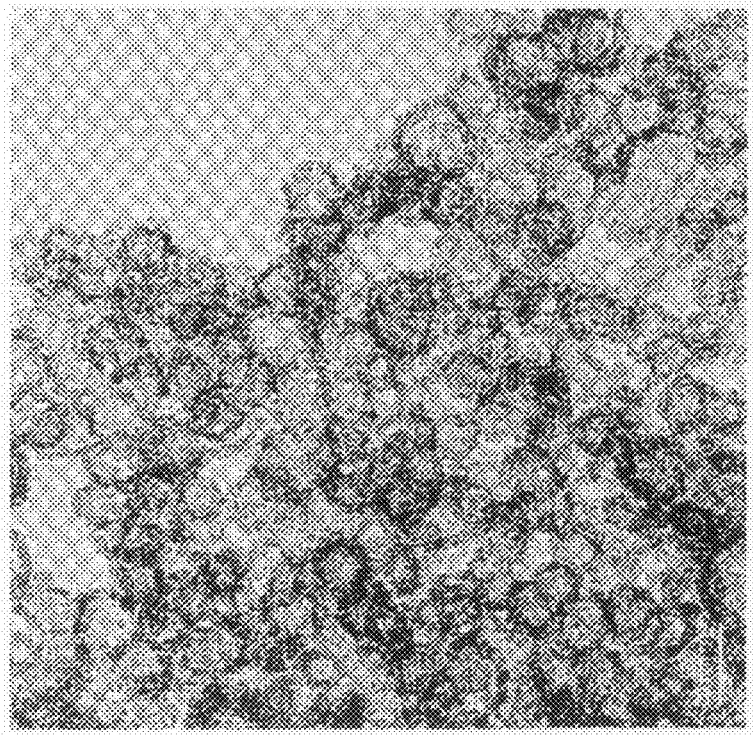
Figure 4:
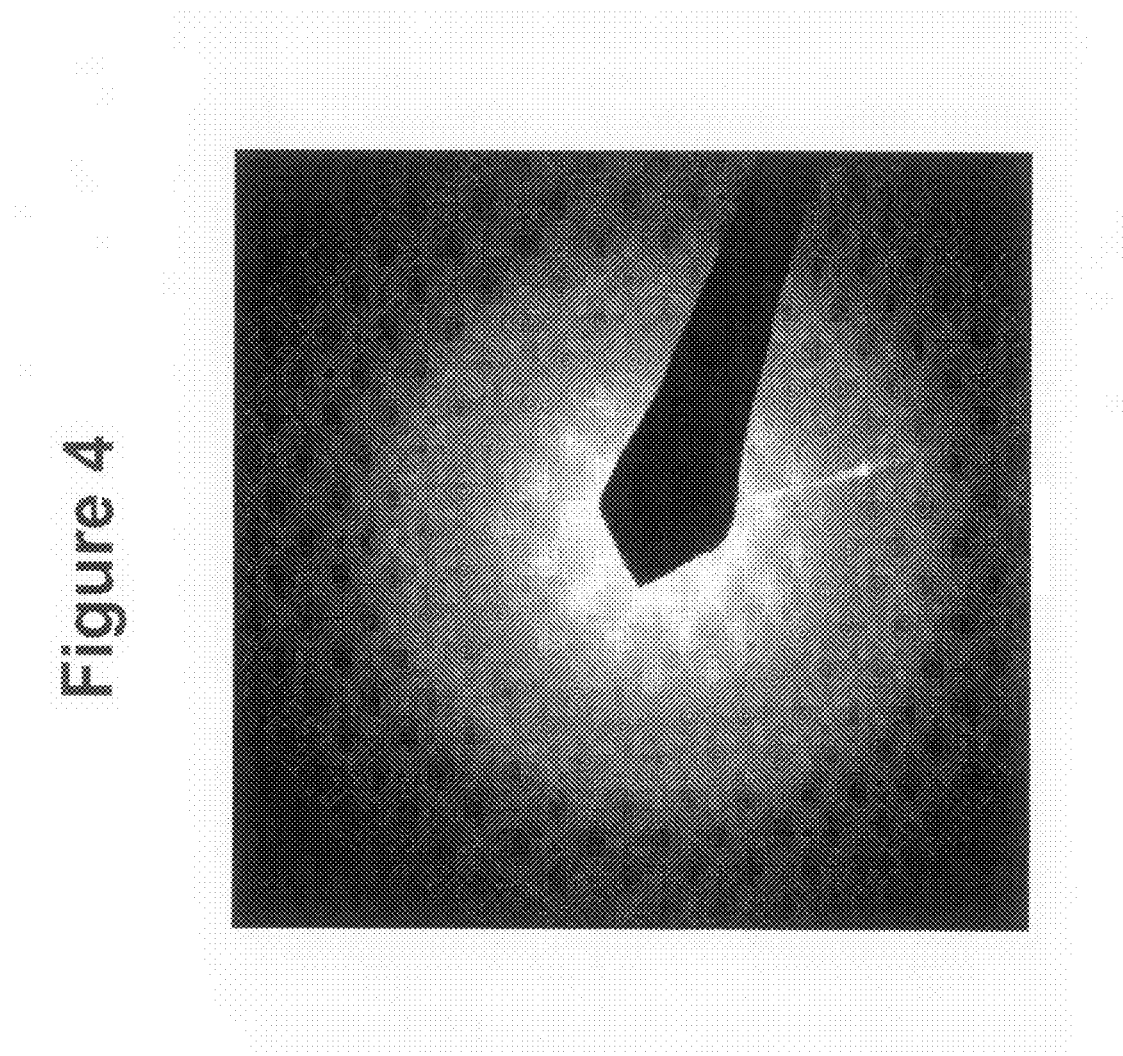
FIG. 4 is an electron diffraction pattern of the hollow silica showing the amorphous structure formed.
Figure 5:
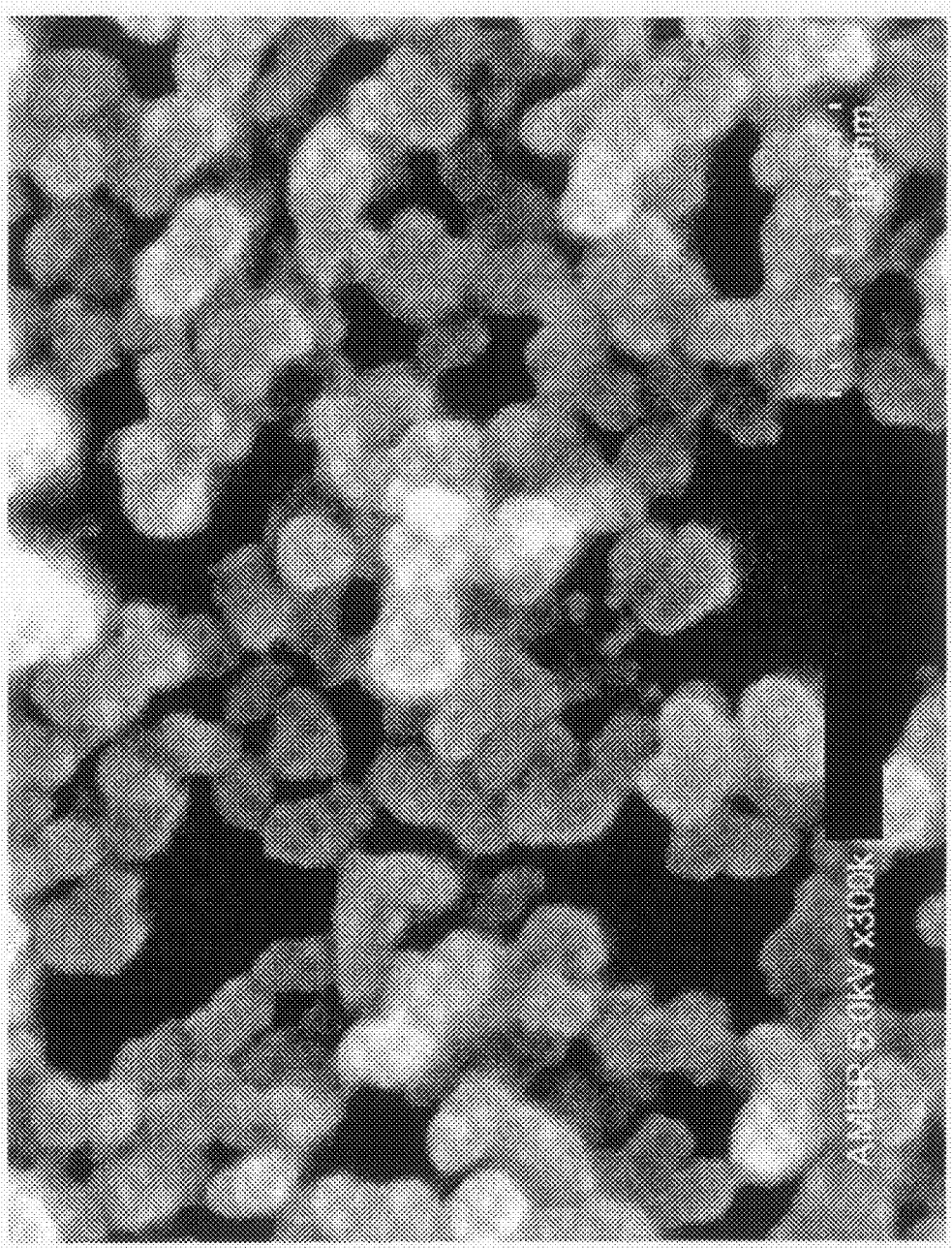
FIG. 5 is a SEM image of the surface morphology of the hollow silica revealing there is no broken particles observed under the detection condition used.

FIGS. 2a and 2b show the TEM and high resolution TEM (HRTEM) images of hollow silica, respectively. It is seen that majority silicon nanoparticles become hollow silica with a shell thickness of 2-3 nm. FIG. 3 shows the EDS composition analysis of the particles which confirms the formation of $SiO_2$. The electron diffraction pattern in FIG. 4 shows the amorphous structure of the formed hollow silica. The SEM image of the particle surface morphology shown in FIG. 5 reveals that there is no broken hollow silica particles observed under the detection condition used.

The control of the oxidation rate was significant for hollow structure formation. If the reaction rate was too slow, the whole process will take too long which can not be practically applied in use. To the contrary, fast reaction rate caused difficulty of process control and dispersion of formed nanoparticles.

It has been observed that parameters including water concentration in step (b) and (e), pH value (ammonia concentration) in step (c), sonication time/temperature in step (d) and (f) affect the hollow silica properties including, for example, particle morphology, shell thickness and density. For instance, high temperature and high ammonia concentration (or pH>12) cause the formation of continuous film-like structure (from TEM image) without identity of individual nanoparticles (data not shown). It could be largely related to high reaction rate induced instability of the formed hollow structure such as dissolving of Si—OH structure or formation of Si—O bonds between two particles and quick building up of surface stress, which eventually causes the collapse of the shells and the formation of the film-like structure with holes.

These examples demonstrate that desired hollow-structure can be produced if the oxidation reaction is carefully engineered.

Example 2

Formation of Hollow Silica Under Various Reaction Conditions

This example demonstrates the effects of different reaction conditions on hollow silica formation.

Samples A0-E0 were prepared according to the conditions outline in table 1 using the methods described above under Example 1.

TABLE 1

| | Properties of Starting Si | |
|---|---|---|
| Samples | Average Crystal Size (±2 nm) | BET Surface Area (±5 nm) |
| A0 | 23 | 65 |
| B0 | 23 | 65 |
| C0 | 23 | 65 |
| D0 | 10 | 160 |
| E0 | 32 | 55 |

Samples A0-E0 were dispersed in propylene glycol or methanol to form dispersions of Si samples A1-E1 with different concentrations according to the specifications outlined in Table 2.

TABLE 2

Dispersion of Si

| Samples | Concentration (wt %) | Solvent Volume (ml) | Type |
|---|---|---|---|
| A1 | 0.1 | 60 | Propylene Glycol |
| B1 | 1 | | |
| C1 | 1 | | |
| D1 | 1 | | |
| E1 | 0.5 | 60 | Methanol |

Samples A1-E1 were subsequently subjected to the reaction conditions outlined in Table 3 to form hollow silica nanoparticle samples A2-E2.

TABLE 3

Synthesis of Hollow SiO2 Nanoparticles

| | 1$^{st}$ step Oxidation | | | 2$^{nd}$ step Oxidation | | | |
|---|---|---|---|---|---|---|---|
| Samples | $H_2O + NH_4 \cdot OH^{(a)}$ (ml) | Temperature (±2° C.) | Time$^{(b)}$ (hour) | $H_2O$ (ml) | Temperature (±2° C.) | Time$^{(b)}$ (hour) | Time$^{(c)}$ (hour) |
| A2$^{(d)}$ | 3 + 1.25 | 25 | 4.5 | 0 | 25 | 0 | 24 |
| B2 | 3 + 1.25 | 25 | 2 | 7 | 25 | 9 | 40 |
| C2 | 1.5 + 1.25 | 25 | 2 | 7 | 25 | 9 | 48 |
| D2 | 1.5 + 0.35 | 25 | 2 | 5 | 25 | 4 | 8 |
| E2 | 3 + 1.25 | 27 | 1 | 4 | 27 | 4 | 15 |

Note:
$^{(a)}NH_4 \cdot OH$ is from aqueous ammonia (24%);
$^{(b)}$With bath ultra-sonication (300 W/37 kHz);
$^{(c)}$Extra time required to complete oxidation after bath ultra sonication;
$^{(d)}$Sample A2 involved only one addition of water, but the oxidation was allowed to continue following a bath sonication portion of the procedure as noted in the table.

Examples of oxidation conditions used for hollow silica synthesis based on different initial silicon particle sizes and silicon particle dispersion conditions are shown in Table 3. A one step oxidation procedure was used for sample A2, and two-step oxidation procedures were used for samples B2-E2. Sample A2 involved a lower particle concentration than the samples involving a two-step oxidation. Other reaction variables include water and ammonia concentrations, number of oxidation steps, duration of ultra-sonication, total reaction time, and reaction temperature. The primary particle size and average shell thickness of samples A2-E2 were measured and results listed in Table 4.

TABLE 4

Properties of Hollow SiO$_2$

| Samples | Primary Particle Size (±5 nm) | Average Shell Thickness (±2 nm) |
|---|---|---|
| A2 | 30 | 4 |
| B2 | 30 | 4 |
| C2 | 30 | 6 |
| D2 | 15 | 3 |
| E2 | 40 | 5 |

Conclusions of hollow silica formation experiments are summarized in the following.

(1) Hollow Particle Size Control

According to hollow silica synthesis experiments that have been performed using the process described herein, it can be concluded that the final size of hollow silica particles is primarily determined by initial Si nanoparticle size. It is, therefore convenient to vary the hollow silica nanoparticle size by using different sized Si particles, which can be obtained by changing the process conditions of NPM™ synthesis. To improve the quality of hollow silica particles synthesized from silicon nanoparticles, oxidation parameters should be adjusted when initial Si particle size is changed dramatically. The adjustment mainly focuses on reactant (i.e. $H_2O$) concentration and pH value (i.e. $NH_4.OH$ concentration). Typically, oxidation of smaller Si particle involves less $H_2O$ and lower pH to complete hollow silica formation. As shown in Table 3, in comparison with sample C2, sample D2 is made from smaller silicon particles and was processed with less ammonia. Despite the lower pH requirement, the pH of the reaction, however, was still maintained in the basic range.

Smaller silicon nanoparticles have more exposed surface area for reactant to penetrate and diffuse into the core with shorter diffusion pathway. The overall reaction rate of the smaller silicon nanoparticles is therefore faster than larger Si particles under the same reaction conditions. When smaller silicon nanoparticles are used, it is generally desirable to reduce the reaction rate to an appropriate range to prevent the breakage of shells and keep the integrity of the particle's hollow structure. One of the appropriate ways to achieve appropriate condition for smaller sized silicon particles is to reduce the reactant concentration proportionally and keep the total reaction time and other parameters the same as the suitable conditions used for larger particles (data not shown).

Figure 6:
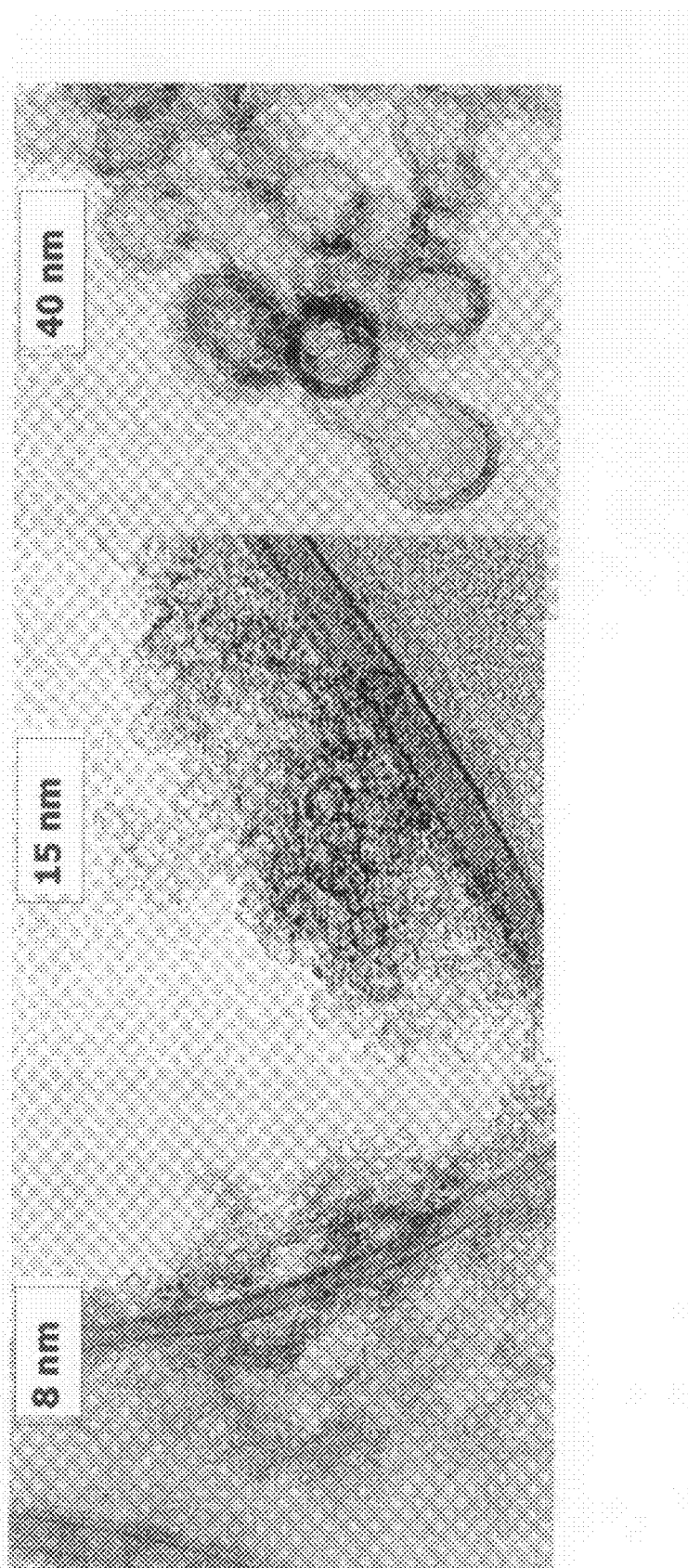
FIG. 6 is a panel of three electron micrographs showing samples of hollow silica with different sizes ranging from 8-40 nm made from corresponding Si particles with different sizes.

FIG. 6 shows TEMs of hollow SiO$_2$ samples with different sizes (8, 15, 40 nm) made from different sized silicon nanoparticles. The synthesis conditions and procedures were similar for each sample with slight variation The mechanism for hollow silica particle formation is probably not impacted by initial Si particle size but final hollow particle size is directly influenced by the size of Si nanoparticles. It is also observed that final hollow size can be larger (~40-50%) than initial silicon size due to the expansion effect and mass balance during hollow formation. For example, hollow silica samples D2 and E2 with average sizes about 15 and 40 nm, respectively are made from silicon particles with average sizes about 10 and 32 nm, respectively.

(2) Shell Thickness Control

Figure 7:
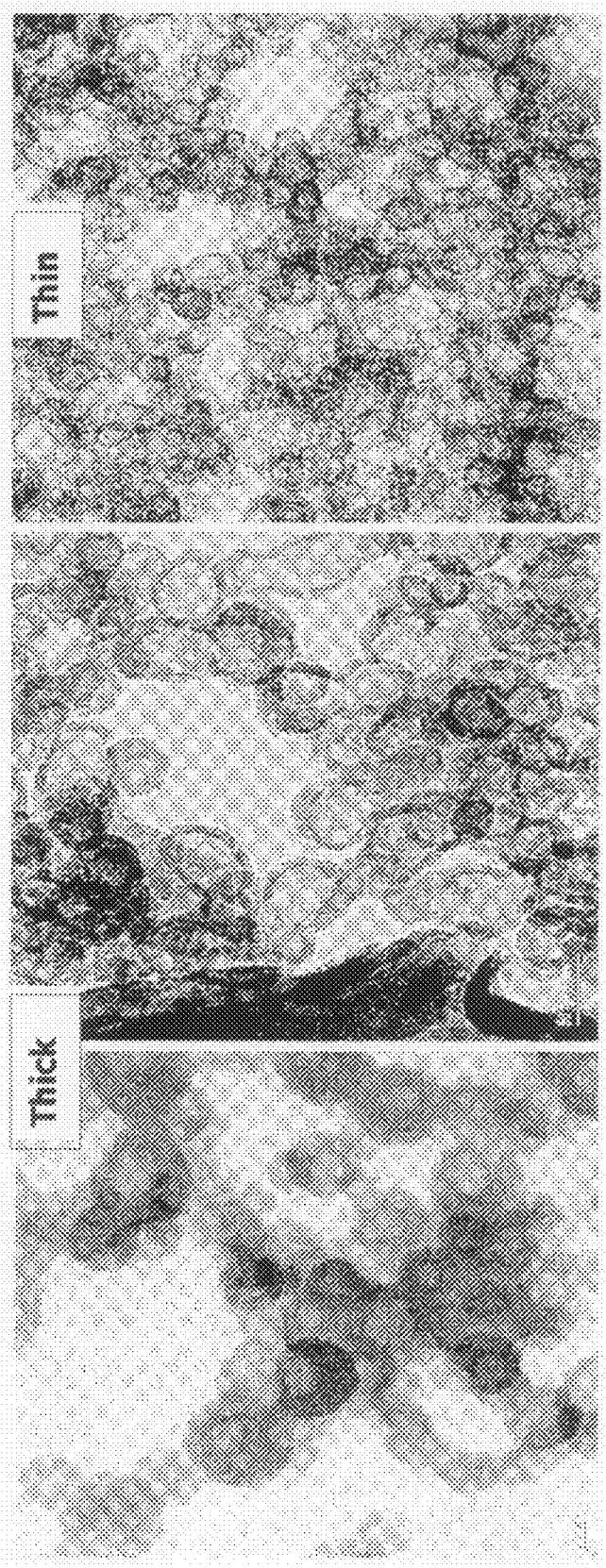
FIG. 7 is a panel of three electron micrographs showing hollow silica with different shell thicknesses.

Without being bound to a particular theory of operation, lower reactant concentration, slower reaction rate, or shorter reaction time can be favorable for thicker shell formation. On the other hand, faster reaction rate (shorter reaction time) causes both Si structure breakages from inside of the particle and SiO$_2$ dissolution from outside of the particle. The breakage and dissolution of either the inside or outside of the particle usually results in thinner shells and sometimes the coexistence of thin shells and films. Consequently, the shell thickness is controllable by engineering the oxidation rate during each step of the multi-step oxidations to avoid reaction rate being too slow or too fast. For example, variation in the oxidation rate of the first step can change the shell thickness of the particles due to the reaction rate change of entire process. FIG. 7 shows the shell thickness difference of samples B2 and C2 based on different synthesis conditions. The particles in sample C2 have relatively thicker shells (6 nm) and were synthesized with less water (1.5 ml) and longer reaction time. The particles in sample B2 have relatively thinner shells (4 nm) and were synthesized with more water (3 mL) and shorter reaction time.

Additionally, there are other factors affecting the shell thickness such as steps of water added and sonication power and time, which can change dissolution rate of Si—OH structure both inside and outside of the hollow silica. The use of a two-step oxidation process provides more control over shell thickness. For different two-step oxidation procedures, the use of a fixed amount of water in the first step reduced the control flexibility of the shell thickness formed. But other conditions were changed accordingly (e.g. reaction time) to complete the oxidation process with control over the shell thickness.

(3) Solvent Selectivity of Hollow Formation

Because the difficulty to remove propylene glycol after synthesis, solvents with low boiling point or high vapor pressure can be desirable in some applications. Additionally because water is used in hollow silica formation, polar solvents with low boiling point can be good candidates. For example, methanol was found to be applicable for hollow silica formation as demonstrated by the conversion of sample E1 to E2. When sample E1 is converted to E2, it is observed that the longer silicon particle is exposed in methanol, the more difficult it is to oxidize the silicon particles for hollow silica formation. This phenomenon is far less pronounced when propylene glycol is used as the reaction solvent and could be attributed to the side reaction between methanol and Si to form SiOCH$_3$. The SiOCH$_3$ formation may slow down OH$^-$ diffusion into silicon particles. When methanol is used as the reaction solvent, it is therefore desirable to start hollow silica formation procedure immediately once a good dispersion state is reached to minimize the above discussed side reaction.

(4) Water Resistance as a Measure of Porosity

The water resistance of a sample is a direct measure of the porosity of a sample. The water resistance was measured for representative hollow silica (h-silica) particles essentially equivalent to samples E1 and E2 above, with or without a polymer binder.

Test 1 Neat Hollow Silica (Without Polymer)

Hollow silica dispersion in MIBK was spin coated on Si wafer to form a film. The dispersion had a concentration of greater than 75 weight percent hollow particles. The film was heated at 115° C. 1 hr. The coating thickness after drying was between about 60 nm and about 100 nm. A drop of water was dropped on the film. After a certain time, the water droplet was wiped off. The water resistance property was evaluated based on if there is a mark of the water drop was observed on the film after the drop was wiped off The results are shown in Table 5.

Test 2: Hollow Silica—Polymer Composite

In this test, polymethylmethacrylate (PMMA) was used as matrix for hollow silica. An MIBK solution of the polymer was added into hollow silica dispersion in MIBK. The weight ratio of polymer to silica is 50:50. The mixture was spin coated on silicon wafer and was cured under UV lamp to form a transparent film. The coating had a thickness form about 60 nm to about 100 nm. One drop of distilled water was dropped on the transparent film. After a certain time, the water droplet was wiped off The water resistance property was evaluated based on if there is a mark of the water drop was observed on the film after wiping the drop off. The results are shown in Table 5.

TABLE 5

| Time for water droplet stay | PMMA + h-silica | Neat h-silica coating |
|---|---|---|
| 1 minute | No mark | No mark |
| 1 hour | No mark | No mark |
| 2 hour | No mark | No mark |
| 5 hour | No mark | Mark |
| 6 hour | No mark | |

These results demonstrate that the hollow silica produced by the methods described herein had outstanding water resistance. For comparison, hollow silica particles formed according to the procedure of EP 1 787 959A were bound with a silica based binder, and water resistance was measured by the addition of a drop of water to the resultant coating and wiping the drop off immediately. As shown in Table 2 of the EP '959 application, most of the samples had a mark even wiping the drop off immediately. Even though a different binder was used, it is clear that the hollow silica particles described herein had qualitatively better water resistance indicating much less porosity.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A collection of hollow particles comprising SiO$_2$ with a shell over a hollow core and having an average primary particle size of no more than about 150 nm and a Z-average particle size in propylene glycol following vigorous mixing of no more than about 500 nm, wherein the average shell thickness is from about 5 percent to about 40 percent of the average particle diameter.

2. The collection of hollow particles of claim 1 wherein the average particle size is from about 3 nm to about 100 nm.

3. The collection of hollow particles of claim 1 wherein the shells have an average thickness as measured with a transmission electron micrograph from about 5 percent to about 35 percent of the average particle diameter.

4. The collection of hollow particles of claim 1 wherein the shells have an average thickness as measured with a transmission electron micrograph from about 7 percent to about 30 percent of the average particle diameter.

5. The collection of hollow particles of claim 1 wherein effectively no particles have a diameter greater than about 5 times the average particle diameter.

6. The collection of hollow particle of claim 1 wherein no more than about 10 percent of the particles are fractured.

7. The collection of hollow particles of claim 1 wherein the particles have no more than about 10 ppm atomic metal atoms.

8. The collection of hollow particles of claim 1 wherein there are no visible pores in transmission electron micrographs at a magnification corresponding to 10 nm per centimeter.

9. The collection of hollow particles of claim 1 wherein the particle have a Z-average particle size in propylene glycol following vigorous mixing from about 2 nm to about 100 nm.

10. The collection of hollow particles of claim 1 wherein the particles have an average shell thickness from about 1 nm to about 75 nm.

11. The collection of hollow particles of claim 1 wherein a coating of the particles without a binder does not show a mark after exposure to a water drop for 30 minutes.

12. A collection of hollow particles comprising $SiO_2$ with a shell over a hollow core and having an average primary particle size of no more than about 750 nm, wherein no more than about 10 percent of the particle shells are fractured and wherein there are no visible pores in a transmission electron micrograph at a magnification corresponding to 10 nm per centimeter.

13. The collection of hollow particle of claim 12 wherein a coating of the particles without a binder does not show a mark after exposure to a water drop for 30 minutes.

14. The collection of hollow particles of claim 12 wherein the average particle size is from about 3 nm to about 100 nm.

15. The collection of hollow particles of claim 14 wherein the shells have an average thickness from about 5 percent to about 35 percent of the average particle diameter.

16. The collection of hollow particles of claim 14 wherein no more than about 1 percent of the particle shells are fractured.

17. The collection of hollow particles of claim 12 wherein the particle have a Z-average particle size in propylene glycol following vigorous mixing from about 2 nm to about 100 nm.

18. A composite comprising a polymer and from about 1 weight percent to about 80 weight percent hollow silica particles of claim 12 dispersed within the polymer.

19. The composite of claim 18 wherein no more than about 10 percent of the particles have fractured shells.

20. The composite of claim 18 wherein a surface modifying compound is bonded to the hollow particle surfaces.

21. The composite of claim 18 wherein the composite comprises from about 5 to about 65 weight percent particles.

22. A method for forming a composite of claim 18, the method comprising forming a composite from a dispersion comprising a mixture of hollow silica particles in an organic solvent with a polymer soluble with the organic solvent wherein the composite comprises from about 5 weight percent to about 80 weight percent hollow silica particles and wherein the composite has a transmission of a visible light frequency of at least about 85 percent as a film with a 5 micron thickness formed on a silica glass with an index-of-refraction of 1.45.

23. A method for forming a composite of claim 18, the method comprising forming a composite from a dispersion comprising a mixture of hollow silica particles in an organic solvent with a polymer soluble with the organic solvent wherein the composite comprises from about 5 weight percent to about 80 weight percent hollow silica particles and wherein the composite has a transmission of a visible light frequency of at least about 85 percent as a film with a 5 micron thickness formed on a silica glass with an index-of-refraction of 1.45.

24. The method of claim 23 wherein the particles are bonded with a surface modifying compound.

25. The method of claim 24 wherein the surface modified particles have a Z-average secondary particle size of no more than about 70 mn.

* * * * *